Jan. 25, 1927.

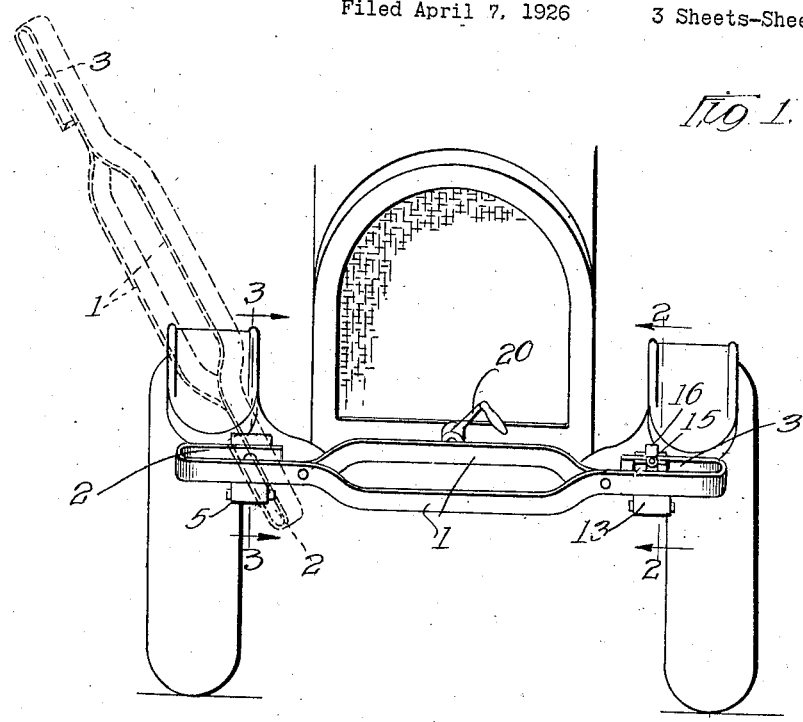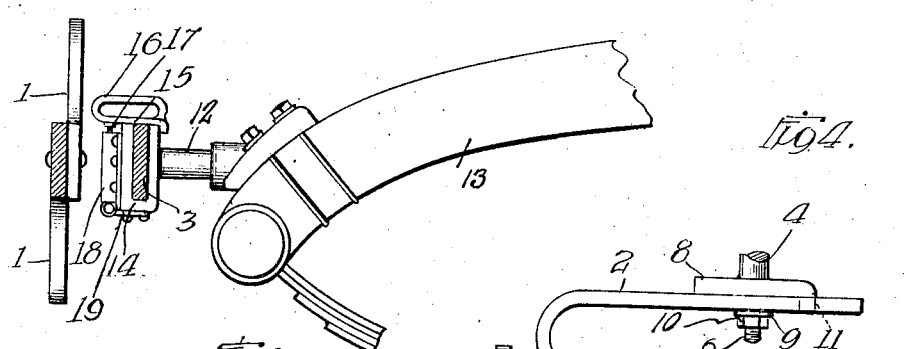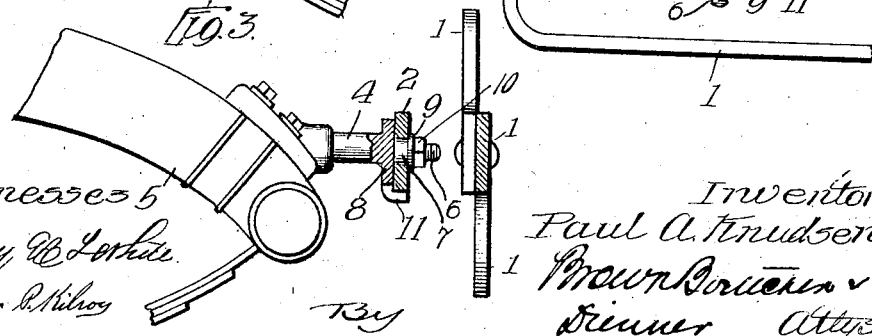

P. A. KNUDSEN 1,615,633

BUMPER

Filed April 7, 1926   3 Sheets-Sheet 2

Witnesses:
Harry R. L. White
William P. Kilroy

Inventor:
Paul A. Knudsen
By Brown, Boettcher & Dienner Attys.

Jan. 25, 1927.
P. A. KNUDSEN
BUMPER
1,615,633
Filed April 7, 1926   3 Sheets-Sheet 3
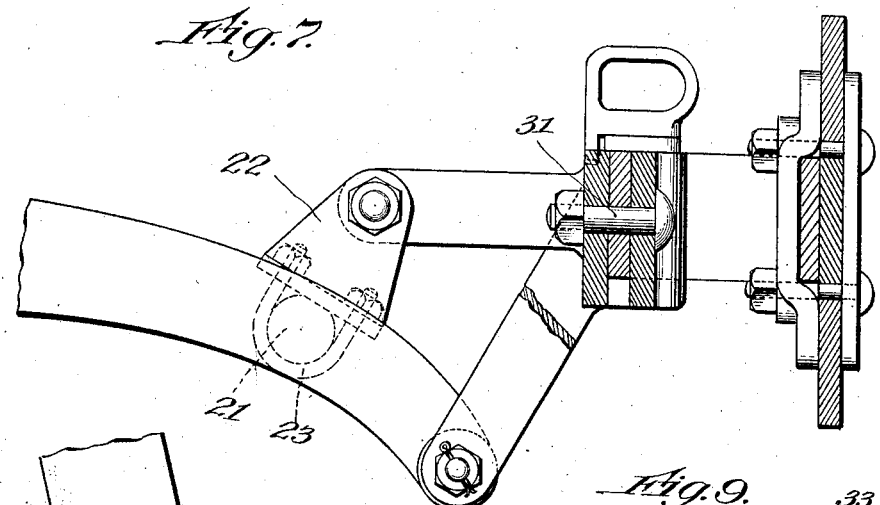
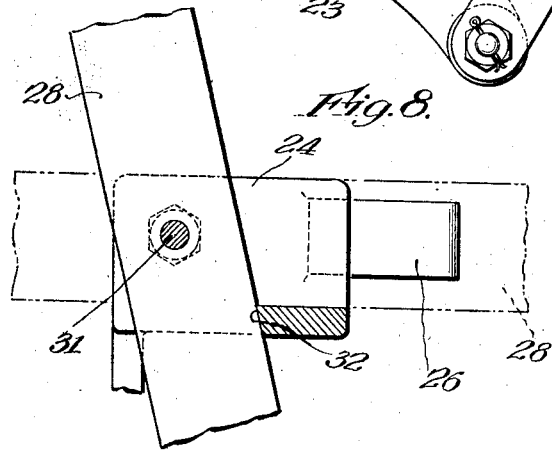
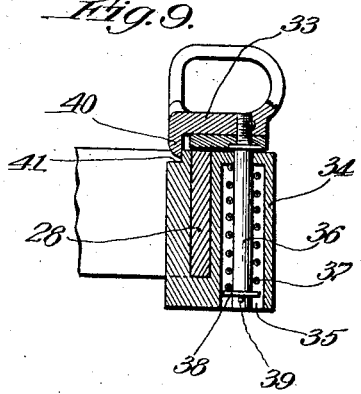
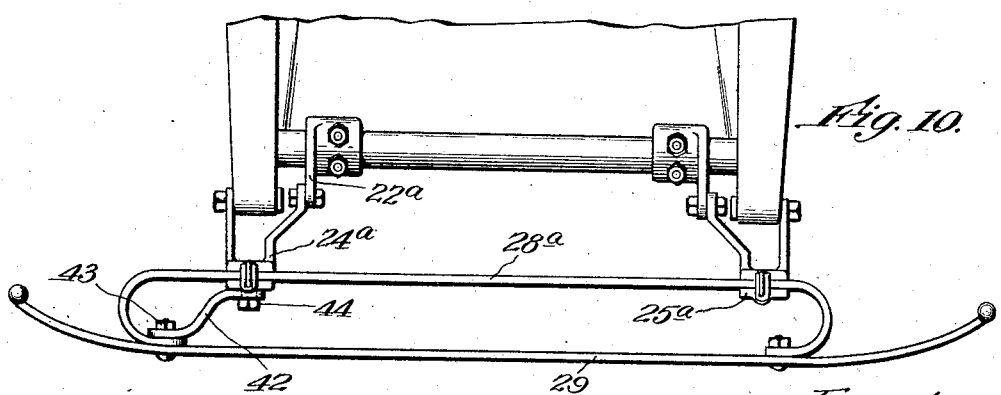
Inventor:
Paul A. Knudsen Patented Jan. 25, 1927.

1,615,633

UNITED STATES PATENT OFFICE.

PAUL A. KNUDSEN, OF MILWAUKEE, WISCONSIN.

BUMPER.

Application filed April 7, 1926. Serial No. 100,354.

This invention relates to a movable bumper for an automotive vehicle such as an automobile, truck, or the like, which has the engine mounted on the frame thereof adjacent such bumper and in such a manner that in case it should become necessary to crank the engine by hand, it would be convenient to remove said bumper out of the way.

A vehicle of the above type is usually provided with a bumper, and very frequently has to have its engine cranked by hand and oftentimes when said vehicle is in a crowded place, as for instance, when said vehicle is parked closely behind another. Particularly at such times it is found that the position of the bumper relative to the crank handle usually makes it inconvenient to operate the latter.

To overcome this difficulty, I provide a bumper for a vehicle of the above type which may be conveniently moved out of the way of the crank handle without the aid of tools and into a position which will not interfere with the operation of said handle.

I am aware that bumpers for vehicles of the above type have been used heretofore which might be moved relative to the crank handle when it is desired to operate the latter, but so far as I am aware such a bumper is operated so that it would be apt to interfere with an object directly in front of the vehicle, whereas, in the use of a bumper embodying my invention the same may be moved out of the way without any forward movement thereof which might cause such an interference. I propose to mount the bumper so that it may be swung upwardly about a pivot adjacent one end thereof to an out-of-the-way position after first releasing its other end, the latter being normally secured in a manner which will not require tools to effect the release thereof. The bumper of my invention may be moved not only so as not to interfere with an object directly in front but also to a position that is entirely out of the way to one side of the vehicle.

Other advantageous features of my invention will be apparent during the course of the following detailed description taken in connection with the accompanying drawings wherein—

Fig. 1 represents a fragmentary front perspective view of an automobile with a bumper embodying my invention attached thereto;

Fig. 2 is a fragmentary section taken at the line 2—2 and showing parts in elevation;

Fig. 3 is a fragmentary section taken at the line 3—3 and showing parts in elevation; and Fig. 4 is a fragmentary detail plan view of Fig. 3.

Fig. 7 is an enlarged fragmentary sectional view taken at the line 7—7 of Fig. 5.

Fig. 8 is an enlarged fragmentary detail view showing the stop and the manner in which it retains the bumper in the out-of-the-way position.

Fig. 9 is an enlarged detail, fragmentary view showing the latch for releasably securing the bumper in operative position;

Fig. 10 is a fragmentary front plan view of a modified form of the bumper.

Figure 5:
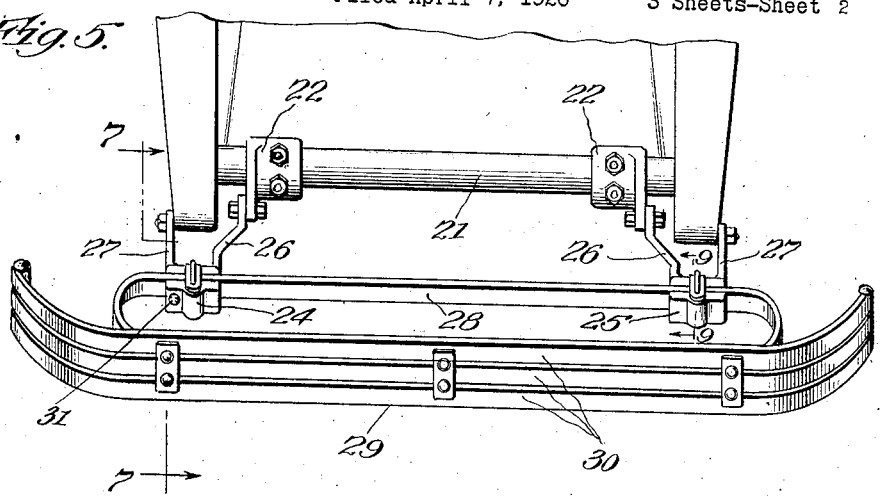
Fig. 5 is a fragmentary front perspective view showing a modified form of my invention adapted for certain types of motor cars as for instance, a Diana.

Referring to the drawings more particularly, there is shown a bumper 1, in this instance of rectangular cross section and having its ends 2 and 3 bent rearwardly and toward each other, but which may be of any suitable cross section and which need not have its ends so bent.

A forwardly extending bracket 4 is suitably bolted to the forward end of a longitudinal side sill member 5 of the automobile frame and is provided at its forward end with a threaded portion 6, a journal 7 rearwardly of said portion and co-axial therewith, and a shoulder 8 to the rear of said journal. The end 2 of the bumper is apertured and loosely mounted on the journal 7. A washer 9 and nut 10 are mounted on the screw portion 6 and act to hold the end 2 on the journal 7, said washer abutting the outer edge of said journal and thus also acting to prevent said nut from binding said end against the shoulder 8. A forwardly projecting lug 11 is provided near the lower edge of the shoulder 8 is offset to the right relative to the journal 7 a considerable distance and extends beneath the lower edge of the end 2 when the bumper 1 is in normal operative position. When the bumper is in upward, out-of-the-way position, as shown in dotted lines in Fig. 1, the edge of the end 2 beneath the pivot point (journal 7) thereof, will abut the lug 11, the latter acting as a stop to retain said bumper about 120 degrees from normal operative position.

A second forwardly extending bracket 12 is suitably bolted on the forward end of the other longitudinal side sill member 13 of the automobile frame and is provided at its forward end with a U-shaped portion 14 adapted to receive the end 3 therein when the bumper 1 is in normal operative position. A spring latch 15 is pivotally mounted on the member 13 and acts to close the opening of the latter for securely holding the end 3 therein. The latch 15 extends across the aforesaid opening in the U-shaped member 14 and is provided with an integral handle 16 near its outer end. A stem 17 rigidly depends from the latch 15 and is slidable in a cylindrical member 18 pivoted at its lower end to a bracket 19 which extends from the forward side of the U-shaped portion 13. A spring (not shown) within the member 18 acts through the stem 17 to hold the latch 15 downwardly. The handle 16 is adapted to receive the fingers therein for lifting the latch 15 and releasing the end 3 of the bumper.

Numeral 20 designates the usual crank handle situated between the front of the automobile and the bumper 1.

In case it is desired to operate the crank handle 20 for cranking the automobile by hand, the right end of the bumper 1 may be released by inserting the finger in the handle 16 and lifting the latch 15, and the bumper swung about its pivot point (the journal 7) until it occupies the dotted line out-of-the-way position shown in Fig. 1, thus making it easier to operate said crank handle. Since the bumper 1, in being moved to its out-of-the-way position makes no forward movement, it may be operated to such position regardless of how close the automobile may be parked behind another when the necessity arises for cranking by hand.

Figure 6:
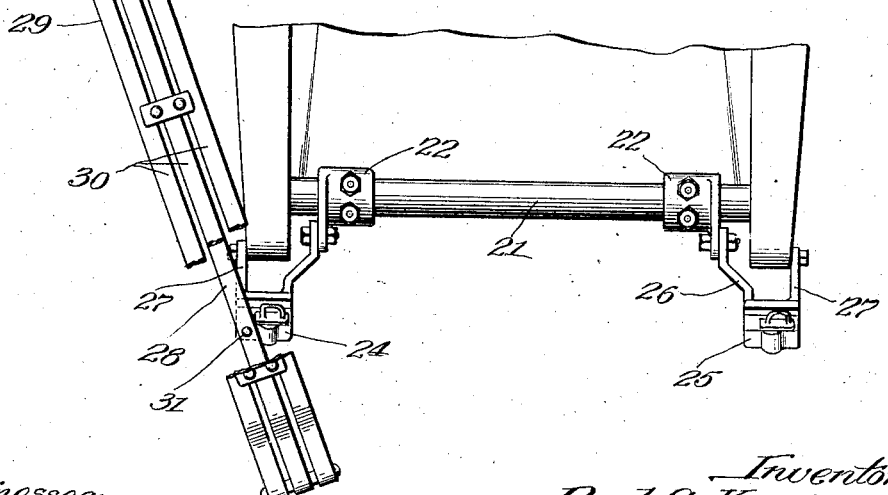
Fig. 6 is a similar view of the same showing the bumper moved to out-of-the-way position.

In Figures 5 to 9 inclusive, there is shown a modified form of the device which is adapted to be used in connection with automobiles which are provided with a transverse bar 21 near the forward end of the frame thereof for connecting the longitudinal members of said frame. In this case a pair of transversely spaced L brackets 22 are secured on the bar 21 by U bolts 23 (Fig. 7). A pair of slotted brackets 24 and 25 are also provided, one on either side of the vehicle frame. Each of the brackets 24 and 25 is provided with an inner rearwardly extending arm 26 and an outer depending arm 27. The inner arm 25 of each bracket is bolted at its end by a transverse bolt to its corresponding bracket 22. The outer depending arm 27 of each of the brackets is rigidly secured to its corresponding longitudinal frame element at the forward end thereof through means of the spring bolt. Each of the brackets 24 and 25 is provided with a transverse vertical groove for receiving a rearwardly spaced bar 28 of a bumper 29. The bumper 29 consists of a plurality of vertically arranged parallel horizontal bars 30 in addition to the bar 28, the ends of the latter being bent forwardly and toward each other and secured to the said bars 30. The bars 30 are secured together and spaced from the bar 28 by the said forwardly bent ends thereof, said ends acting as springs to take up any shock which the bars 30 may receive. When the bumper 29 is in normal position, the bar 28 lies horizontally in the brackets 24 and 25. The left of the bracket 24 is provided with a longitudinal bolt 31 which extends therethrough and the bar 28. The bottom of the groove in the bracket 24 is cut away at the left thereof beneath the bolt 31 leaving a shoulder 32. The bumper may thus be pivoted to the left as shown in Figure 6, and as shown more particularly in Figure 8, the bar 28 will abut the shoulder 32 the latter acting to retain said bumper in the out-of-the-way position. Each of the brackets 24 and 25 is provided with a spring latch 33 similar to the latch 15 in the previous embodiment. Each bracket 24 and 25 is provided with a semi-cylindrical boss 34 (Fig. 9) and a bore 35 beneath the surface of said boss for containing a stem 36 of the latch 33. A spring 37 surrounds the stem 36 within the bore 35 and acts through a washer 38 and pin 39 in said stem to hold the latch 33 in closed position. The latch 33 normally extends over the bar 28 and is provided with a depending lug 40 which normally fits in a recess 41, in the upper rear edge of the bracket.

The latch 33, adjacent the pivot 31, may be turned into place with lug 40 extending into notch 41 after the bumper is raised. This locks the bumper against return movement. Such locking may be employed in case the car stands on a slope or otherwise when it is desired to insure that the bumper will be retained in raised position.

In Figure 10, there is shown a modification in which brackets 24$^a$ and 25$^a$ are provided similar to the brackets 24 and 25 for receiving a bar 28$^a$ of a bumper similar to the bumper 29. The bar 28$^a$ is usually of extremely hard steel and difficult to bore accurately especially after the bumper of which it is a part is assembled. In practice, bumpers of this type would usually have to be accommodated to suit slight variations in widths of cars and consequently the bar 28$^a$ would have to be bored after the bumper was assembled in case the necessity for such boring were not obviated. In Figure 10, a means is shown where the necessity for boring the bar 28ª is eliminated. In this case, a short bar 42 is provided having the ends thereof offset from each other by a diagonal portion, one end of the bar 42 which is T-shaped being connected to the bumper by two bolts 43, the latter being the same bolts which connect the left side of the bar 28ª to the bumper and the other end of said bar 42 being apertured to receive a shouldered bolt 44 which is threaded in the bracket 24ª. The bolt 44 thus acts as the pivot for the bumper without the necessity of piercing the bar 28ª as in the previous modification.

While I have described the bumper as used on the front of the vehicle, where its movement from normal position is desirable to permit the engine to be cranked by hand, it is to be understood that the bumper of my invention may be applied to the rear of the vehicle, where its movement from normal position may be desirable to permit access to spare tires and the like.

In such case the brackets may be modified in suitable manner to connect the arms thereof to suitable parts of the vehicle frame.

I am aware that many changes may be made and many details of construction varied throughout a wide range without departing from the principles of this invention, and I do not propose limiting the patent granted hereon to the details shown or described herein.

I claim:—

1. The combination comprising a bumper, a pivotal mounting for one end of said bumper whereby the entire bumper may be swung upwardly to an out-of-the-way position, and a mounting for the other end of said bumper including means for releasing the same.

2. The combination comprising a bumper and a mounting therefor adapted to be secured to the frame of a vehicle, said mounting including means for pivoting the entire bumper to an out-of-the-way position in a substantially vertical plane.

3. The combination comprising a bumper and a mounting therefor adapted to be secured to the frame of a vehicle, said mounting including means for pivoting the entire bumper to an out-of-the-way position in a substantially vertical plane, and means for retaining said bumper in said out-of-the-way position.

4. The combination comprising a bumper and a mounting therefore adapted to be secured to the frame of a vehicle, said mounting including means for pivoting the entire bumper upwardly to an out-of-the-way position, and a stop for retaining said bumper in said upward out-of-the-way position.

5. The combination comprising a bumper, a pivotal mounting therefor for one end thereof whereby said bumper may be swung upwardly to an out-of-the-way position, and a mounting for the other end of said bumper including a spring latch normally holding said other end in operative position and adapted to be manually operated to release said end to permit said bumper to be swung to said out-of-the-way position.

6. The combination comprising a bumper, a pivotal mounting for one end of said bumper whereby said bumper may be swung upwardly to an out-of-the-way position, and a mounting for the other end of said bumper including a slotted member normally holding said other end in operative position, and a spring latch pivoted adjacent said member normally locking said end therein and adapted to be manually operated to release said end to permit said bumper to be swung to said out-of-the-way position.

7. The combination comprising a bumper and a pivotal mounting for one end thereof whereby the entire bumper may be swung upwardly to an out-of-the-way position.

8. The combination comprising a bumper, a pair of slotted brackets for receiving a portion of said bumper therein and for supporting the same, integral depending arms on said brackets for connection to the forward end of an automobile frame, rearwardly extending integral arms on said brackets, and brackets each connected to one of the latter arms by a transverse bolt and provided with clamps for attachment to a transverse bar on the forward portion of said automobile, said bumper being pivotally secured to one of said brackets.

9. The combination comprising an automobile frame having a transverse bar adjacent the forward end thereof and connecting the longitudinal elements thereof, a bumper, a mounting for said bumper comprising a pair of slotted brackets for receiving a portion of said bumper therein, integral depending arms on said brackets connected at their lower ends to the forward ends of said longitudinal elements, rearwardly extending integral arms on said brackets and brackets each connected to one of the latter arms and clamped to said transverse bar, said bumper being pivotally secured to one of said brackets.

10. The combination comprising a bumper, a pair of slotted brackets for receiving a portion of said bumper therein and for supporting the same, integral depending arms on said brackets for connection to the forward end of an automobile frame, rearwardly extending integral arms on said brackets, brackets adjustably connected to the latter arms and provided with clamps for attachment to a transverse bar on the forward portion of said automobile, and a longitudinal pin in one of said brackets and connected to said bumper whereby said bumper may be pivoted upwardly.

11. The combination comprising a bumper, a support therefor including a slotted bracket adjacent one end thereof, said bumper comprising a transverse front portion and a rearwardly spaced transverse rear portion, the latter portion fitting in said bracket, and means for pivotally securing said bumper to said bracket, said means comprising an auxiliary bar connected between said bumper and the outside of said bracket, the connection between said bar and said bracket forming the pivot for said bumper.

12. The combination comprising a bumper, a support therefor including a slotted bracket adjacent one end thereof, said bumper comprising a transverse front portion and a spaced transverse rear portion, the latter portion being supported in said bracket, an auxiliary bar connected between said bumper and the outside of said bracket, the connection between said bar and said bracket consisting of a pivot bolt extending into said bracket without piercing said rear portion.

13. In combination, a bumper member and mounting means therefor adapted to be secured to the frame of a vehicle, said mounting including a pivot for the bumper member to permit it to be swung from normal to a raised position, means for holding the bumper in its normal position, and means for locking the bumper in its raised position.

14. In combination, a pair of similar bracket members adapted to be secured to the frame of a vehicle, each of said members having a slot, a bumper having a bar adapted to be received in said slots, said bar being pivoted on one of said brackets, the slot in said bracket permitting the bar to be swung from horizontal position to a position substantially vertical, a latch member on each of said brackets reaching across the slot, the latch member on the bracket having a pivot serving to lock the bar in substantially vertical position, and the latch on the other bracket member serving to lock the bar in its horizontal position.

15. A bracket for supporting a vehicle bumper comprising a slotted head, a pair of divergent integral arms connected to the head, and a spring pressed latch member pivotally mounted in the head and adapted to be swung into latching position across the slot.

In witness whereof, I hereunto subscribe my name this 3rd day of April, 1926.

PAUL A. KNUDSEN.